United States Patent
Kamakura (10) Patent No.: US 12,280,779 B2
(45) Date of Patent: Apr. 22, 2025

(54) DRIVING ASSISTANCE APPARATUS

(71) Applicant: Honda Motor Co., Ltd., Tokyo (JP)

(72) Inventor: Hiroshi Kamakura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 335 days.

(21) Appl. No.: 18/110,799

(22) Filed: Feb. 16, 2023

(65) Prior Publication Data

US 2023/0294696 A1  Sep. 21, 2023

(30) Foreign Application Priority Data

Mar. 16, 2022 (JP) ................. 2022-040930

(51) Int. Cl.
*B60W 30/16* (2020.01)

(52) U.S. Cl.
CPC ......... *B60W 30/16* (2013.01); *B60W 2555/60* (2020.02); *B60W 2754/30* (2020.02)

(58) Field of Classification Search
CPC ............. B60W 30/16; B60W 2555/60; B60W 2754/30; B60W 50/14; B60W 2420/403; B60W 30/165; B60W 30/18154; B60W 2050/146; B60W 2420/408; B60W 2554/802; B60W 2556/40; B60W 2556/50; B60W 30/14; B60K 37/00; G08G 1/0116
See application file for complete search history.

(56) References Cited

U.S. PATENT DOCUMENTS

| | | | |
|---|---|---|---|
| 2012/0253629 A1 | 10/2012 | Maruyama | |
| 2021/0224560 A1* | 7/2021 | Kim | B60W 60/001 |

FOREIGN PATENT DOCUMENTS

| | | |
|---|---|---|
| JP | 2012008938 A | 1/2012 |
| JP | 2012206700 A | 10/2012 |
| JP | 2014096016 A | 5/2014 |
| WO | 2018173175 A1 | 9/2018 |

OTHER PUBLICATIONS

Japanese Office action; Application 2022-040930; Jan. 6, 2024.

* cited by examiner

*Primary Examiner* — Yuen Wong
(74) *Attorney, Agent, or Firm* — Duft & Bornsen, PC (57) ABSTRACT

A driving assistance apparatus including a display part and a microprocessor. The microprocessor is configured to perform controlling a travel actuator so that a subject vehicle follows a preceding vehicle while keeping a target inter-vehicle distance, acquiring traffic light information including switching information on a traffic light, position information of the subject vehicle with respect to the traffic light, and inter-vehicle distance information on an inter-vehicle distance from the subject vehicle to the preceding vehicle, and controlling the display part so as to notify the driver of information during following the preceding vehicle based on the traffic light information, the position information and the inter-vehicle distance information, and the controlling including controlling the display part so as to notify information on a recommended inter-vehicle distance allowing the subject vehicle to travel while following the preceding vehicle without receiving a stop instruction from the traffic light.

13 Claims, 7 Drawing Sheets

DRIVING ASSISTANCE APPARATUS

CROSS-REFERENCE TO RELATED APPLICATION

This application is based upon and claims the benefit of priority from Japanese Patent Application No. 2022-040930 filed on Mar. 16, 2022, the content of which is incorporated herein by reference.

BACKGROUND OF THE INVENTION

Field of the Invention

This invention relates to a driving assistance apparatus that assists a driving operation of a driver.

Description of the Related Art

Conventionally, as an apparatus of this type, there is a known apparatus that notifies a start timing of accelerator-off operation to a driver of the vehicle traveling on the road where the traffic light is installed. Such an apparatus is described, for example, in Japanese Unexamined Patent Publication No. 2014-096016 (JP2014-096016A). In the apparatus described in JP2014-096016A, a timing of a deceleration operation is notified to the driver via the display unit so that the vehicle can pass through the intersection where the traffic light is installed in a non-stop manner.

However, the apparatus described in JP2014-096016A does not assume a vehicle having a function of following a preceding vehicle while keeping a predetermined inter-vehicle distance, and it is difficult for a driver of the vehicle having such a function to notify useful driving assistance information.

SUMMARY OF THE INVENTION

An aspect of the present invention is a driving assistance apparatus including: a display part displaying information; and an electronic control unit including a microprocessor and a memory connected to the microprocessor. The microprocessor is configured to perform: controlling a travel actuator so that a subject vehicle follows a preceding vehicle traveling ahead of the subject vehicle while keeping a target inter-vehicle distance; acquiring traffic light information including switching information on a traffic light, position information on a position of the subject vehicle with respect to the traffic light, and inter-vehicle distance information on an inter-vehicle distance from the subject vehicle to the preceding vehicle, the traffic light periodically instructing a driver to stop at a predetermined position; and controlling the display part so as to notify the driver of information during following the preceding vehicle, based on the traffic light information, the position information and the inter-vehicle distance information acquired, and the microprocessor is configured to perform the controlling including controlling the display part so as to notify information on a recommended inter-vehicle distance allowing the subject vehicle to travel while following the preceding vehicle without receiving a stop instruction from the traffic light.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1A:
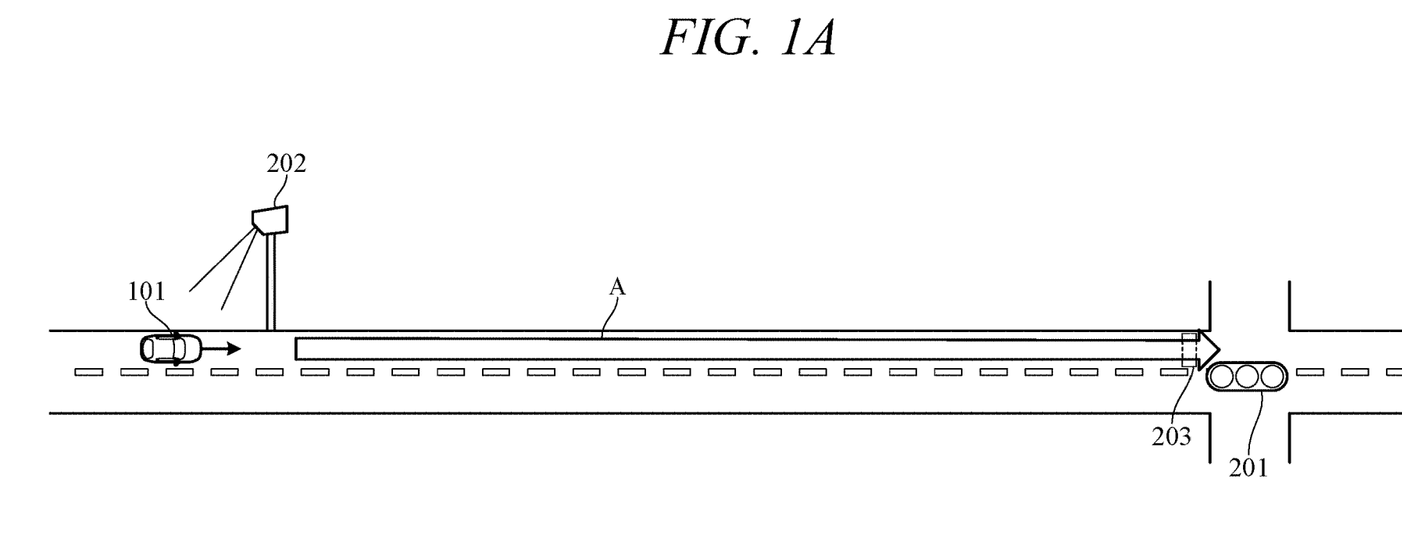
FIG. 1A is a diagram showing an example of a travel scene of a vehicle having a driving assistance apparatus according to an embodiment of the present invention.
Figure 1B:
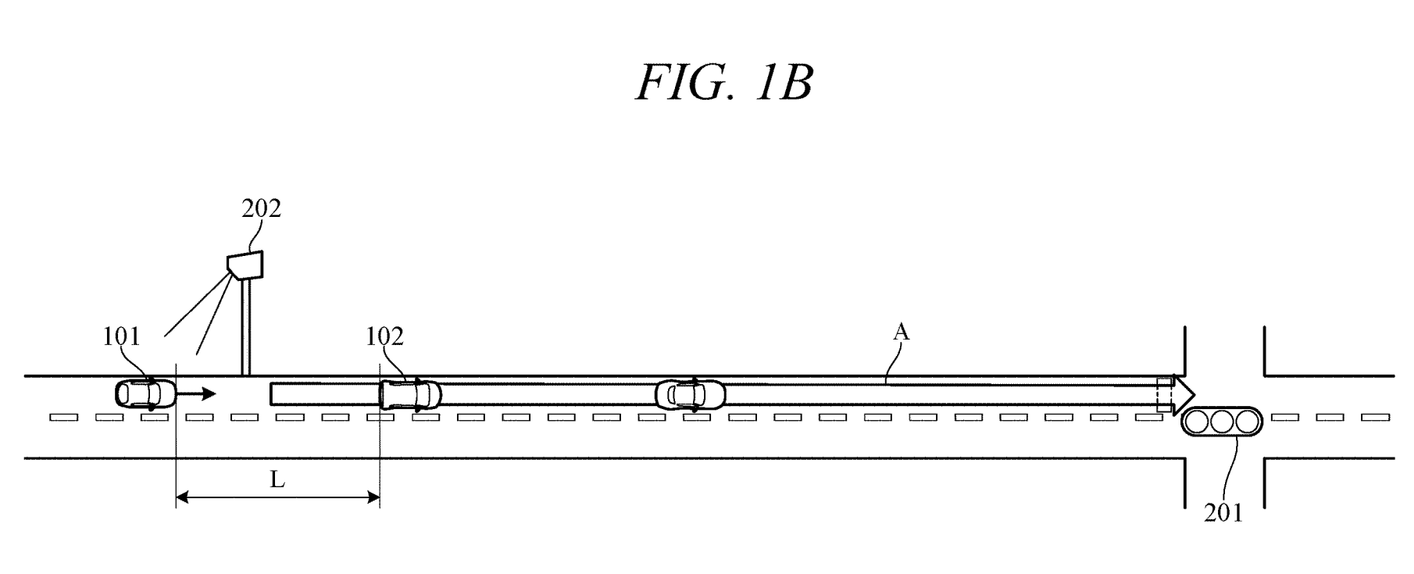
FIG. 1B is a diagram showing another example of the travel scene of the vehicle having the driving assistance apparatus according to the embodiment of the present invention.

Hereinafter, an embodiment of the present invention is explained with reference to FIGS. 1A to 6. FIGS. 1A and 1B are diagrams showing examples of travel scenes of a subject vehicle having a driving assistance apparatus according to an embodiment of the present invention. FIGS. 1A and 1B illustrates an example of the vehicle 101 traveling along an arrow "A" on a road on which a traffic light 201 is installed. The vehicle 101 is called "a subject vehicle" to distinguish it from other vehicles. The subject vehicle 101 has a following traveling function of following a preceding vehicle while maintaining a predetermined inter-vehicle distance.

Specifically, FIG. 1A illustrates an example in which a preceding vehicle traveling ahead of the subject vehicle 101 does not exist in a section from the subject vehicle 101 to the traffic light 201, and FIG. 1B illustrates an example in which the preceding vehicle 102 exists in the section. In particular, in FIG. 1B, the subject vehicle 101 travels while controlling a travel actuator of the subject vehicle 101 so as to maintain the inter-vehicle distance L between the subject vehicle 101 and the preceding vehicle 102 to a target value corresponding to a vehicle speed, that is, the subject vehicle 101 performs a following travel of following the preceding vehicle 102. As shown in FIG. 1A, a case in which the preceding vehicle does not exist or a case in which the subject vehicle does not follow the preceding vehicle such that the inter-vehicle distance is kept constant even if the preceding vehicle exists, is referred to as non-following travel.

The traffic light 201 is configured to sequentially switch between a red light indicating a stop instruction, a green light (a blue light) indicating that traveling is possible, and a yellow light indicating that traveling is possible but safe stop is difficult at a predetermined cycle. The traffic light may be an arrow traffic light which indicates a travelable direction by an arrow, rather than the light color is switched. The traffic light may be sequentially switched between green light and red light.

The subject vehicle 101 receives traffic light information on the traffic light 201 from a communication device (e.g., an optical beacon roadside unit 202) such as an optical beacon, a radio beacon installed on the side of the road. The traffic light information includes switching information of the traffic light 201, for example, switching information such as remaining time until the traffic light 201 switches from green to yellow and from red to green. FIG. 1A and FIG. 1B illustrate the example in which the subject vehicle 101 passes through the intersection where the traffic light 201 is installed at green or yellow light without stopping, that is, the example in which the subject vehicle 101 travels without stopping at a stop line 203.

In the situation where the subject vehicle 101 travels toward the intersection where the traffic light 201 is installed, the driving assistance apparatus according to the embodiment of the present invention is configured to provide predetermined information to the driver of the subject vehicle 101 based on the traffic light information received from the optical beacon roadside unit 202. That is, the driving assistance apparatus has a driving assistance function for notifying the driver of driving assistance information suitable for the non-following travel when the non-following travel is performed, while driving assistance information suitable for the following travel when the following travel is performed.

Although not shown, the switching from the non-following travel to the following travel is performed by an operation of a following travel start switch provided at or near a steering wheel by the driver. On the other hand, when an accelerator pedal or a brake pedal is operated by a driver to intervene in a driving operation during the following traveling, the following traveling is switched to the non-following traveling. It is also possible to switch from the following traveling to the non-following traveling by an operation of a release switch for instructing a release of the following traveling.

The driving assistance information on the vehicle speed range and the information on the deceleration instruction are displayed on a display device provided on an instrument panel facing the driver. A display of a navigation unit disposed at the vicinity of the instrument panel can also be used as the display device. The display device may be configured by a head-up display for projecting an image on a panel provided at a windshield or near the windshield.

Figure 2A:
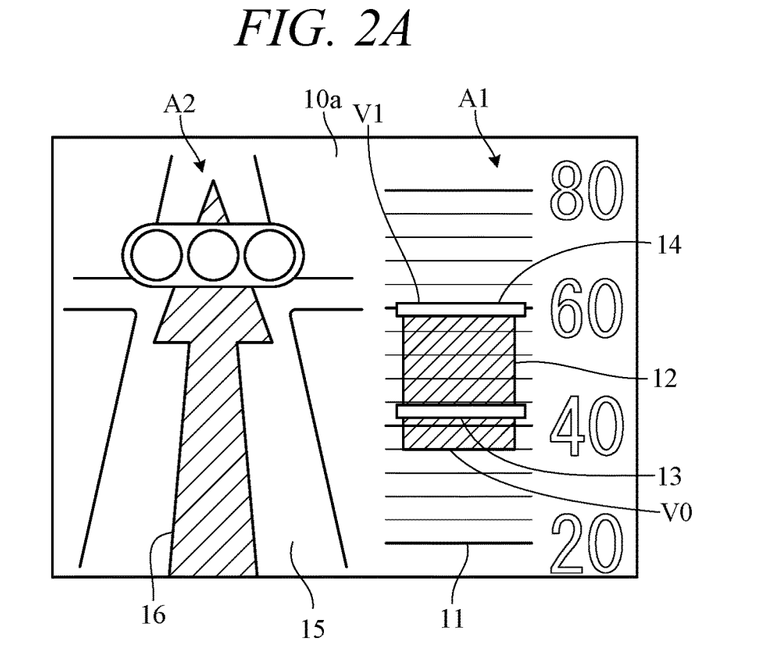
FIG. 2A is a diagram showing an example of a display screen during a non-following travel by the driving assistance apparatus according to the embodiment of the present invention.
Figure 2B:
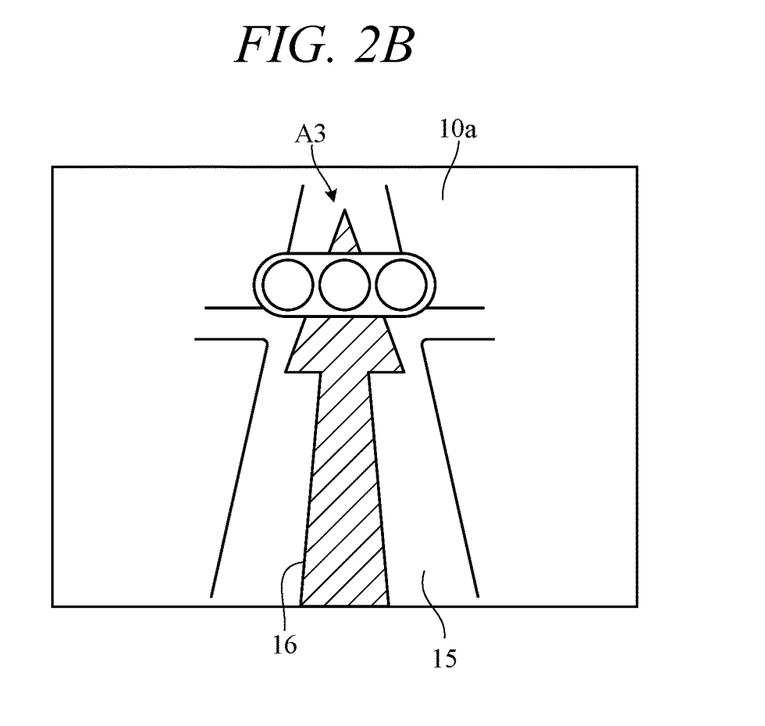
FIG. 2B is a diagram showing an example of the display screen during a following travel by the driving assistance apparatus according to the embodiment of the present invention.

Each of FIG. 2A and FIG. 2B is a diagram illustrating an example of a display screen 10a displayed on a display device (a monitor 10 in FIG. 4) when the subject vehicle can pass through an intersection where the traffic light is installed without stopping. In particular, FIG. 2A shows an example when the non-following travel is performed, and FIG. 2B shows an example when the following travel is performed. As shown in 2A, an image indicating the target vehicle speed range is displayed in the area A1 of one of the left and right sides (for example, the right side) of the display screen 10a, and an image indicating that the subject vehicle can pass through the intersection where the traffic light is installed without stopping is displayed in the area A2 of the other of the left and right sides (for example, the left side). As shown in FIG. 2A, on the display screen 10a, an image indicating the target vehicle speed range is displayed in the area A1 of one of the left and right sides (e.g., the right side), and an image indicating that the subject vehicle can pass through the intersection where the traffic light is installed without stopping is displayed in the area A2 of another of the left and right sides (e.g., the left side).

More specifically, the image of the area A1 includes a scale image 11 indicating the vehicle speed on a scale along with a numerical value, a target vehicle speed image 12 (hatching) indicating the target vehicle speed range in which the subject vehicle can pass through the intersection where the traffic light ahead of the subject vehicle is installed without stopping, a bar-shaped subject vehicle speed image 13 indicating the current vehicle speed of the subject vehicle, and a bar-shaped legal speed image 14 indicating the legal speed of the road. The target vehicle speed image 12, the subject vehicle speed image 13, and the legal speed image 14 are displayed on the scale image 11 in association with the scale image 11. The monitor has a color display. The scale image 11, the target vehicle speed image 12, the subject vehicle speed image 13, and the legal speed image 14 are displayed in different colors from each other. The target vehicle speed image 12 is indicated by a belt-shaped image extending from the minimum value V0 to the maximum value V1 of the target vehicle speed. In FIG. 2A, the maximum value of the target vehicle speed range coincides with the legal speed. The display of the legal speed image 14 may be omitted.

In the area A2, a background image 15 schematically showing a road and a traffic light, and a driving behavior image 16 (hatching) indicating that the subject vehicle can travel without stopping at the intersection where the traffic light is installed, are displayed. The driving behavior image 16 is an image showing the driving behavior of the subject vehicle 101 passing through the intersection where the traffic light 201 is installed without the subject vehicle 101 stopping. If the subject vehicle speed is within the target vehicle speed range, the subject vehicle can travel without stopping at the intersection. In response to this situation, in the example of FIG. 2A, the driving behavior image 16 is represented by an image of an arrow exceeding the traffic light image on the road image of the background image 15. Thus, on the display screen 10a, the subject vehicle speed image 13 indicating the current vehicle speed is displayed in association with the target vehicle speed image 12 indicating the target vehicle speed range, and further, the driving behavior image 16 of the subject vehicle corresponding to the target vehicle speed range is displayed. Therefore, the driver can easily grasp necessity of acceleration and deceleration of the subject vehicle for smoothly passing through the intersection where the traffic light is installed, and good driving assistance for the driver is possible.

On the other hand, during the following travel, as shown in FIG. 2B, the background image 15 and the driving behavior image 16 are displayed on a central area A3 of the display screen 10a. That is, during the following travel, the driver is interested in the inter-vehicle distance from the preceding vehicle rather than the vehicle speed of the subject vehicle. Therefore, an image indicating the target vehicle speed range or the like, such as the image displayed in the area A1 of FIG. 2A, is not displayed, and information indicating whether or not the subject vehicle can pass through the intersection without stopping is displayed. For example, only an image similar to one displayed in the area A2 of FIG. 2A is displayed. As described above, since unnecessary information is not displayed on the monitor during the following travel, it is possible to prevent the driver from being confused due to the unnecessary information display. The images in FIG. 2A and FIG. 2B are images indicating that the subject vehicle can pass through the intersection with the traffic light without stopping, and each of the images is referred to as a passable image.

Figure 3A:
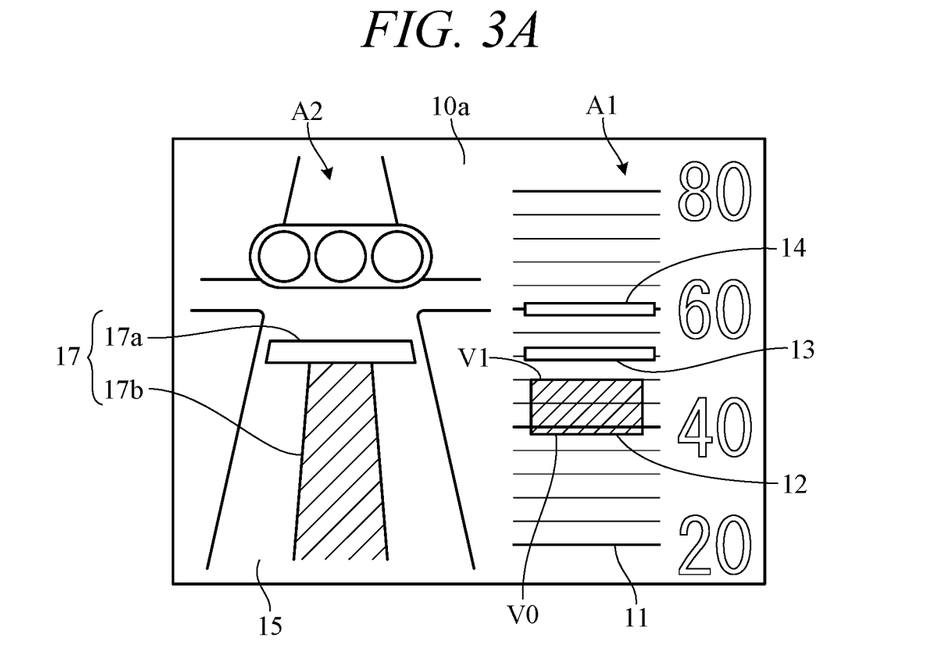
FIG. 3A is a diagram showing another example of the display screen during the non-following travel by the driving assistance apparatus according to the embodiment of the present invention.
Figure 3B:
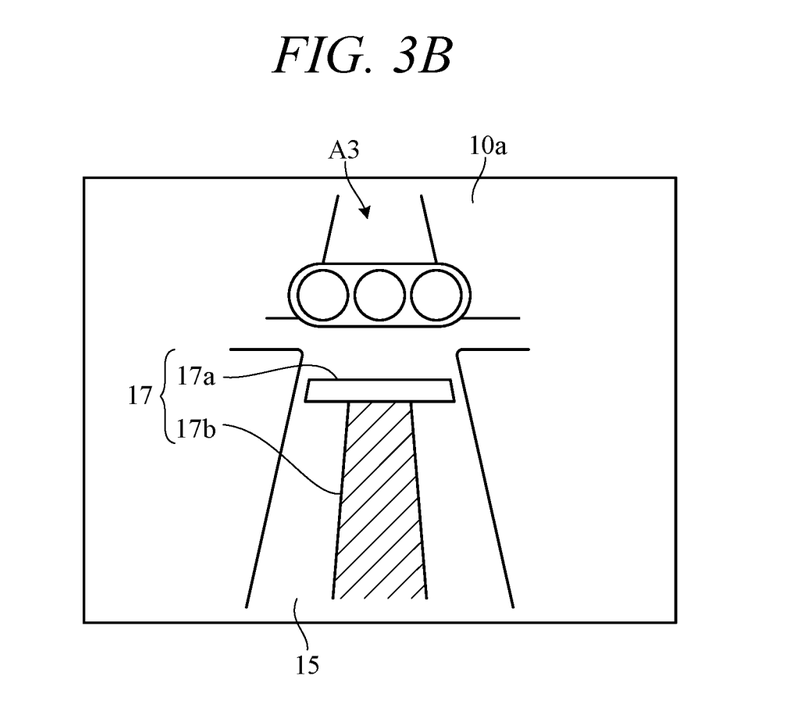
FIG. 3B is a diagram showing another example of the display screen during the following travel by the driving assistance apparatus according to the embodiment of the present invention.

If the traffic light switches from green to red before the subject vehicle reaches the traffic light, or if the traffic light is still red when the subject vehicle reaches the traffic light, the subject vehicle needs to stop in front of the traffic light. Each of FIG. 3A and FIG. 3B is a diagram illustrating an example of the display screen 10a in such a case, and corresponds to the display screen 10a when the subject vehicle stops at the stop line 203 in front of the traffic light 201 in FIG. 1A. FIG. 3A shows an example during the non-following travel, and FIG. 3B shows an example during the following travel.

As shown in FIG. 3A, the target vehicle speed image 12, the subject vehicle speed image 13, and the legal speed image 14 are displayed in the area A1. The target vehicle speed image 12 is an image showing the target vehicle speed range for the traveling vehicle to stop smoothly on the stop line while suppressing the deceleration to a predetermined value or less. The target vehicle speed image 12 may be omitted. In the area A2, a deceleration stop image 17 indicating the deceleration and stop instruction of the subject vehicle is displayed on the background image 15. Specifically, the deceleration stop image 17 including an image 17a of the stop line and a band-shaped image 17b as shown by hatching toward the image 17a is displayed.

Thus, when the deceleration of the subject vehicle is required to stop the subject vehicle in front of the traffic light (when the subject vehicle speed is larger than the target vehicle speed), the deceleration stop image 17 indicating an instruction of the deceleration operation is displayed on the display screen 10a. Accordingly, the driver can easily recognize necessity of the deceleration operation, and can decelerate the subject vehicle at a good timing.

When the traffic signal is switched to green while the vehicle speed of the subject vehicle is reduced to the target vehicle speed and the subject vehicle can smoothly pass through the intersection with the traffic light, such information may be displayed.

On the other hand, during the following travel, as shown in FIG. 3B, the deceleration stop image 17 is displayed on the central area A3 of the display screen 10a. That is, during the following travel, the driver does not perform much driving operation for adjusting the vehicle speed. Therefore, an image indicating the target vehicle speed range or the like, such as the image displayed in the area A1 of FIG. 3A, is not displayed, and information indicating that the subject vehicle stops at the stop line is displayed. For example, only an image similar to one displayed in the area A2 of FIG. 3A is displayed. FIG. 3A and FIG. 3B are images indicating that the subject vehicle cannot pass through the intersection with the traffic light without stopping, and each of the images is referred to as an unpassable image.

Although not shown, in a state where the subject vehicle is traveling on a road capable of providing the above-described traffic light information (traffic light passing assistance information) and there is no traffic light that is an object of traffic light passing assistance (for example, a traffic light is a push button type or the like), some of the above-described displays are not displayed. For example, during non-following travel, the target vehicle speed image 12, the driving behavior image 16 and the deceleration stop image 17 are not displayed. Therefore, on the display screen 1a, the scale image 11, the subject vehicle speed image 13 and the legal speed image 14 are displayed in the area A1, and the background image 15 is displayed in the area A2. On the other hand, during the following travel, the driving behavior image 16 and the deceleration stop image 17 are not displayed, and the background image 15 is displayed in the area A3 on the display screen 1a.

When the subject vehicle is following the preceding vehicle, there are cases where the preceding vehicle can smoothly pass through an intersection at which the traffic light is green, whereas the subject vehicle fails to pass through the intersection without stopping because the traffic light has already turned yellow or red. If shortening the inter-vehicle distance to the preceding vehicle, however, the subject vehicle may be able to pass through the intersection while the traffic light is green. In such cases, the driver is preferably notified of this information, so that he/she can avoid affecting the surrounding traffic flow to maintain traffic smoothness, which leads to improved traffic safety. In consideration of this fact, the present embodiment implements a driving assistance apparatus as described below.

Figure 4:
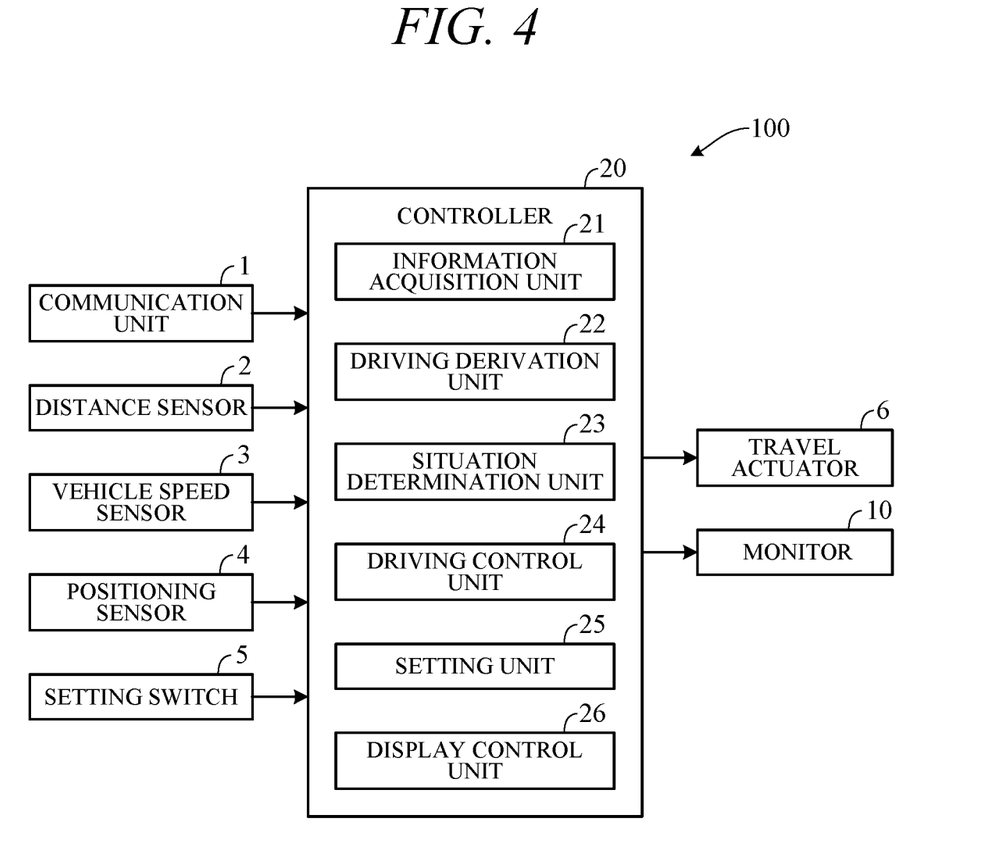
FIG. 4 is a block-diagram illustrating a configuration of a main part of the driving assistance apparatus according to the embodiment of the present invention.

FIG. 4 is a block-diagram schematically illustrating a configuration of a main part of the driving assistance apparatus 100 according to the embodiment of the present invention. As shown in FIG. 4, the driving assistance apparatus 100 includes a controller 20, and a communication unit 1, a distance sensor 2, a vehicle speed sensor 3, a positioning sensor 4, a setting switch 5, a travel actuator 6 and a monitor 10 which are communicably connected to the controller 20, respectively. Although not shown, a following travel start witch for instructing a start of the following travel is also connected to the controller 20.

The communication unit 1 is configured to be capable of wirelessly communicating with the optical beacon roadside unit 202 (FIGS. 1A and 1B) provided on the road, that is, capable of road-to-vehicle communication. The communication unit 1 receives, from the communication device provided in the optical beacon roadside unit 202, the traffic light information on the traffic light located in the traveling direction of the subject vehicle, i.e., the traffic light information on the traffic light installed at the intersection where the subject vehicle passes next. The traffic light information includes position information of the traffic light and information on the switching time of the light color of the traffic light. The information on the switching time includes information on the remaining time until the traffic light is switched from green to yellow when the traffic light is currently green, and information on the remaining time until the traffic light is switched to green next when the traffic light is not currently green (for example, red).

The distance sensor 2 detects an inter-vehicle distance L between the subject vehicle 101 and the preceding vehicle 102 as illustrated in FIG. 1B. The distance sensor 2 can be, for example, a LIDAR that measures a distance and direction from an object (preceding vehicle) by emitting a pulsed infrared laser beam and detecting a reflected beam reflected by the object or a radar that detects a distance and direction from the object by emitting an electromagnetic wave and detecting a reflected wave. The LIDAR and the radar can also detect a speed of the object. The vehicle speed sensor 3 detects the vehicle speed of the subject vehicle.

The positioning sensor 4 receives signal for positioning transmitted from the positioning satellite. Positioning satellites are artificial satellites such as GPS satellites and quasi-zenith satellites. Using positioning information received by the positioning sensor 4, the current position of the subject vehicle (latitude, longitude, altitude) is measured. The positioning sensor 4 is used to detect the position (distance to the signal, etc.) of the subject vehicle relative to the position of the intersection where the traffic light is installed. Therefore, it is also possible to use a distance detector (radar, LIDAR, etc.) for detecting the distance from the subject vehicle to the object (object in the vicinity of the intersection) in place of the positioning sensor 4.

The setting switch 5 is to be operated by the driver to set a target inter-vehicle distance La when the subject vehicle is following the preceding vehicle. The setting switch 5 is provided on or near the steering wheel, for example, so that the driver can operate it while holding the steering wheel. In response to the operation on the setting switch 5, the target inter-vehicle distance La can be switched in the four steps: a short distance La1, a middle distance La2, a long distance La3, and a longest distance La4, for example. More specifically, the setting switch 5, which is a press-type switch, is formed such that the target inter-vehicle distance La is sequentially switched to . . . La1, La2, La3, La4, La1 . . . each time its operation portion is depressed.

The setting switch 5 may be provided with the operation portion for use in instructing lengthening/shortening of the target inter-vehicle distance La. The setting switch 5 may be configured to lengthen the target inter-vehicle distance La when an increment instruction is input from the operation portion and to shorten the target inter-vehicle distance La when a decrement instruction is input from the operation portion. The short distance La1, the middle distance La2, the long distance La3, and the longest distance La4 to which the target inter-vehicle distance La can be set establish a relationship La1<La2<La3<La4. Each of La1 to La4 is pre-stored in a storage unit (storage part) as the function of the vehicle speed. More specifically, each of La1, La2, La3, and La4 is a function indicating the magnitude (level) of the target inter-vehicle distance La. Thus, the four characteristics (functions), each of which is related to the vehicle speed V and indicates the magnitudes of the target inter-vehicle distance La, are stored in the storage unit. Each of the four characteristics is set such that the target inter-vehicle distance La is lengthened in proportion to the vehicle speed of the subject vehicle. Utilizing these characteristics makes it possible to calculate the target inter-vehicle distance La in relation to the vehicle speed. For example, when the subject vehicle is traveling at a vehicle speed V10 with the target inter-vehicle distance La set to the short distance La1, the target inter-vehicle distance La is set to La1_1. If the subject vehicle accelerates to a vehicle speed V20 (>V10), the target inter-vehicle distance La is set to La1_2, which is longer than La1_1. When La1, La2, La3, and La4 are compared at the same vehicle speed, the target inter-vehicle distances La calculated based on the characteristics of La1 to La4 become longer in this order.

The controller 20 executes predetermined processing on the basis of signals from the communication unit 1, the distance sensor 2, the vehicle speed sensor 3, the positioning sensor 4 and the setting switch 5, and outputs control signal to the travel actuator 6 and the monitor 10 including the display screen 10a. The travel actuator 6 is an actuator for driving the subject vehicle, and when the travel drive source is an engine, the travel actuator 6 includes a throttle actuator for adjusting an opening degree (a throttle opening degree) of a throttle valve of the engine. When the travel drive source is a traveling motor, the traveling motor is included in the travel actuator 6. A brake actuator for operating a braking device of the subject vehicle 101 and a steering actuator for operating a steering device are also included in the travel actuator 6.

The controller 20 includes an electronic control unit having a microprocessor and a memory connecting the microprocessor. More specifically, the controller 20 includes a computer including a CPU, a ROM, a RAM, and other peripheral circuits such as an I/O interface. The controller 20 includes, as functional components, a situation determination unit 23, a driving control unit 24, a setting unit 25, and a display control unit 26.

In the memory of the controller 20, a relationship between the vehicle speed V during the following travel and the target inter-vehicle distance La is pre-stored for each of setting values La1, La2, La3 and La4 of the target inter-vehicle distance La in accordance with the operation of the setting switch 5. Further, road information is stored in advance in the memory of the controller 20. The road information includes information on a legal speed for each road.

The information acquisition unit 21 acquires traffic light information received by the communication unit 1, information (inter-vehicle distance information) on the inter-vehicle distance L from the preceding vehicle detected by the distance sensor 2, information (vehicle speed information) on the vehicle speed V of the subject vehicle detected by the vehicle speed sensor 3, information (position information) on a current position of the subject vehicle detected by the positioning sensor 4, and information (target inter-vehicle distance information) on the target inter-vehicle distance La set by the setting switch 5 when the following travel is performed. Further, the information acquisition unit 21 specifies a road on which the subject vehicle is traveling according to the position information of the subject vehicle and acquires information (legal speed information) on the legal speed corresponding to the road on the basis of the road information stored in advance in the memory.

During the following travel, the driving derivation unit 22 derives recommended driving for the driver on the basis of the traffic light information, the vehicle speed information, the position information, and the legal speed information acquired by the information acquisition unit 21. Specifically, the driving derivation unit calculates a distance between the subject vehicle and the intersection where a traffic light is installed by using the position information and also calculates a vehicle speed range in which the subject vehicle can pass through the intersection without stopping on the basis of the above distance and a remaining time until the traffic light ahead of the subject vehicle changes from green to yellow included in the traffic light information. Then, the driving derivation unit calculates, as the target vehicle speed range, a vehicle speed range equal to or lower than the legal speed within the above vehicle speed range. The target vehicle speed range is included in the recommended driving for the driver.

During the non-following travel, the driving derivation unit 22 determines whether the subject vehicle can pass through the intersection without stopping at a vehicle speed equal to or lower than the legal speed. When determining that the subject vehicle cannot pass through the intersection without stopping at the vehicle speed equal to or lower than the legal speed, the driving derivation unit 22 calculates a target vehicle speed range for the subject vehicle to smoothly stop in front of the traffic light, i.e., in front of the stop line at the intersection. Then, in case where the vehicle speed of the subject vehicle included in the vehicle speed information exceeds the target vehicle speed, the driving derivation unit derives a deceleration instruction including the target vehicle speed range as the recommended driving. Alternatively, the driving derivation unit simply derives a deceleration instruction for stopping the subject vehicle in front of the traffic light, without calculating the target vehicle speed range.

The situation determination unit 23, when the subject vehicle is following the preceding vehicle, determines whether the preceding vehicle will be able to pass through the intersection without stopping and also whether the subject vehicle will be able to pass through the intersection without stopping. These determinations are based on the traffic light information, the actual inter-vehicle distance information, the vehicle speed information, the position information, the target inter-vehicle distance information, and the legal speed information, all of which have been acquired by the information acquisition unit 21. In this case, the situation determination unit 23 first detects a vehicle speed of the preceding vehicle, based on both the vehicle speed V of the subject vehicle detected by the vehicle speed sensor 3 and a variation in the actual inter-vehicle distance L detected by the distance sensor 2. Alternatively, the situation determination unit 23 may detect the vehicle speed of the preceding vehicle by acquiring the vehicle speed information from the preceding vehicle via the communication unit 1. The situation determination unit 23 then uses both the position information and the actual inter-vehicle distance information to calculate a distance between the preceding vehicle and the intersection at which the traffic light is installed. After that, based on the calculated distance, a remaining time that is contained in the traffic light information and indicates a time until the traffic light ahead of the preceding vehicle is switched from green to yellow, and the vehicle speed of the preceding vehicle, the situation determination unit 23 determines (i.e., predicts) whether the preceding vehicle will be able to pass through the intersection without stopping.

When determining that the preceding vehicle will be able to pass through the intersection without stopping, the situation determination unit 23, in turn, determines whether the subject vehicle following the preceding vehicle will also be able to pass through the intersection without stopping. More specifically, the situation determination unit 23 determines whether the subject vehicle will be able to pass through the intersection without stopping while keeping the target inter-vehicle distance La, based on the information on the remaining time, which indicates the time until the traffic light is switched from green to yellow, the vehicle speed information, and the target inter-vehicle distance information at the time just before the preceding vehicle passes through the intersection. When determining that the subject vehicle will be unable to pass through the intersection without stopping while keeping the target inter-vehicle distance La, the situation determination unit 23, in turn, determines whether the subject vehicle will be able to pass through the intersection without stopping by shortening the target inter-vehicle distance La. This determination corresponds to determination of whether the subject vehicle is in a specific situation (predetermined situation).

When the subject vehicle is not following another vehicle, i.e., during the non-following travel, the driving control unit 24 controls the travel actuator 6 in the subject vehicle in accordance with driver's drive operation. When the subject vehicle is following another vehicle, i.e., during the following travel, the driving control unit 24 sets the target inter-vehicle distance La, based on both the vehicle speed information and the target inter-vehicle distance information acquired by the information acquisition unit 21 and then controls the travel actuator 6 so that the actual inter-vehicle distance L becomes equal to the target inter-vehicle distance La.

The setting unit 25 extracts a characteristic according to the operation on the setting switch 5 from among the characteristics of the plurality of target inter-vehicle distances related to the vehicle speed pre-stored in the storage unit. The setting unit 25 then use the extracted characteristic to calculate and set the target inter-vehicle distance La in relation to the vehicle speed. Furthermore, the setting unit 25 automatically changes the setting of the target inter-vehicle distance La independently of the operation on the setting switch 5. More specifically, when the driver operates the setting switch 5 to shorten the target inter-vehicle distance La so that the subject vehicle following the preceding vehicle passes through the intersection without stopping, the setting unit 25 automatically returns the setting of the target inter-vehicle distance La to the previous one after the subject vehicle has passed through the intersection. After the setting unit 25 automatically changes the setting of the target inter-vehicle distance La, the driving control unit 24 controls the travel actuator 6 so that the actual inter-vehicle distance L becomes equal to the target inter-vehicle distance La that has been previously set.

The display control unit 26 controls an image displayed on the monitor 10. More specifically, the display control unit 26 controls the display image, based on a determination result of the driving derivation unit 22 when the subject vehicle does not follow another vehicle, namely, a determination result of whether the subject vehicle will be able to pass through the intersection without stopping at a vehicle speed equal to or lower than a legal vehicle speed, or a determination result of the situation determination unit 23 when the subject vehicle follows another vehicle, namely, a determination result of whether the subject vehicle will be able to pass through the intersection without stopping while following the preceding vehicle. The display control unit 26 then outputs a control signal to the monitor 10 so as to display, on the monitor 10, either a passable image (see FIG. 2A and FIG. 2B) indicating that the subject vehicle will be able to pass through the intersection without stopping or an unpassable image (see FIG. 3A and FIG. 3B) indicating that the subject vehicle will be unable to pass through the intersection without stopping. When the subject vehicle does not follow another vehicle, the display control unit 26 displays, on the monitor 10, the target vehicle speed image 12, the subject vehicle speed image 13, the legal speed image 14, the background image 15, the driving behavior image 16, and the deceleration stop image 17, for example. When the subject vehicle is following another vehicle, the display control unit 26 displays, on the monitor 10, the background image 15, the driving behavior image 16, and the deceleration stop image 17, for example.

When the situation determination unit 23 determines that the subject vehicle will be able to pass through the intersection together with the preceding vehicle by shortening the target inter-vehicle distance La, the display control unit 26 notifies the driver of this determination result. The shortening of the target inter-vehicle distance La refers to a setting change (e.g., La3 to La2 or La2 to La1) made by the setting switch 5 so as to shorten the target inter-vehicle distance La.

Figure 5:
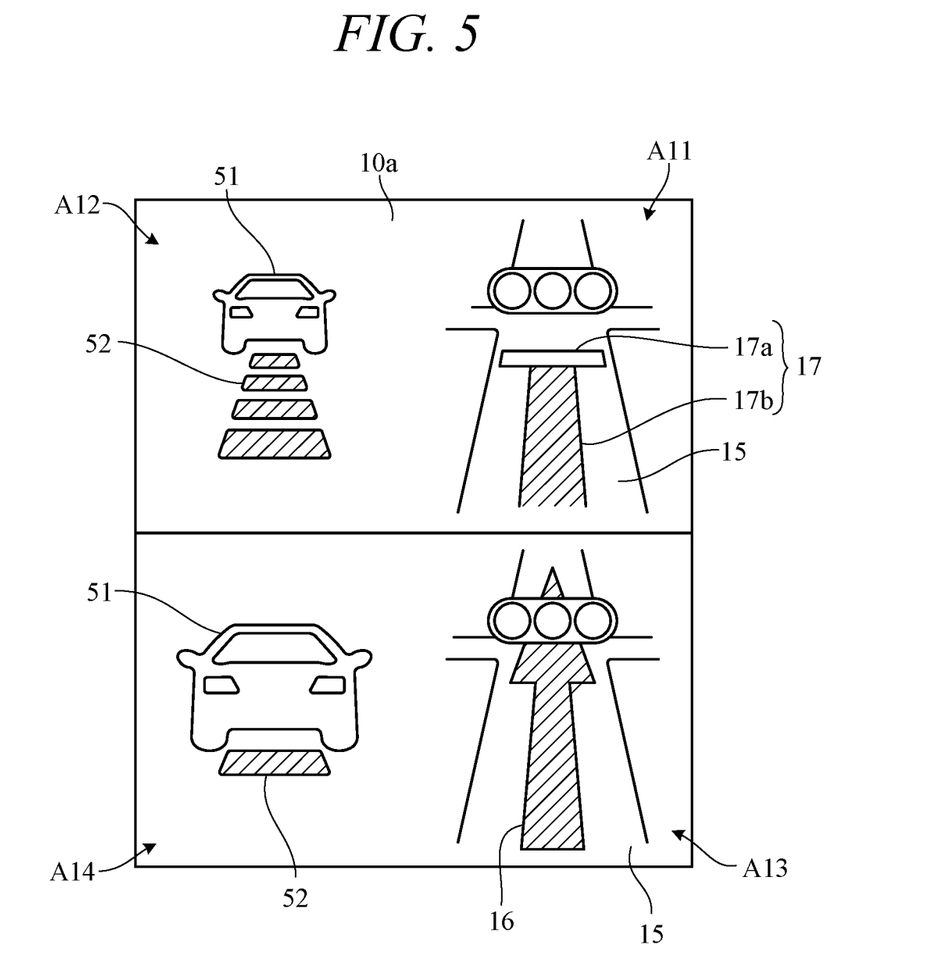
FIG. 5 is a diagram showing an example of the display screen in a specific situation during the following travel by the driving assistance apparatus according to the embodiment of the present invention.

After having determined that the subject vehicle will be unable to pass, without stopping, through the intersection where the preceding vehicle will be able to pass without stopping, the situation determination unit 23 determines that the subject vehicle will be able to pass it through by shortening the target inter-vehicle distance La, the display control unit 26 outputs the control signal to the monitor 10 so as to display, on the monitor 10, an image (referred to as a conditional passable image) related to the determination result. FIG. 5 is a diagram illustrating an example of the conditional passable image displayed on the monitor 10. This image is displayed when the situation determination unit 23 determines that the subject vehicle is in the specific situation. FIG. 5 illustrates an example case where the driver has preset the target inter-vehicle distance La to the longest distance La4.

As illustrated in FIG. 5, the display screen 10a is typically divided into four areas: an upper right area A11, an upper left area A12, a lower right area A13, and a lower left area A14. An image displayed within the upper right area A11 indicates that, if the subject vehicle continues to follow the preceding vehicle while keeping a target inter-vehicle distance La that has been currently set, the subject vehicle will be unable to pass through the intersection without stopping. In this case, the displayed image is formed by scaling down an image (unpassable image) which is the same as that illustrated in FIG. 3B containing the background image 15 and the deceleration stop image 17.

An image displayed within the upper left area A12 is related to the setting of the target inter-vehicle distance La that has been currently set. More specifically, both a vehicle image (first preceding vehicle image) 51, which imitates the rear surface of the preceding vehicle, and a inter-vehicle distance image (first inter-vehicle distance image) 52 (hatching), which indicates the inter-vehicle distance to the preceding vehicle, are displayed. As the target inter-vehicle distance La is lengthened, the inter-vehicle distance image 52 is also lengthened. Since the target inter-vehicle distance La is set to the longest distance La4 in the example of FIG. 5, the inter-vehicle distance image 52 also becomes the longest. Actually, as the inter-vehicle distance is lengthened, the preceding vehicle contained in the driver's field of view is downsized. Therefore, when the inter-vehicle distance image 52 is lengthened, the vehicle image 51 is downsized. In short, the image within the upper left area A12 reflects a scene contained in the driver's field of view.

Displayed within the lower left area A14 are a vehicle image (second preceding vehicle image) 51 and a inter-vehicle distance image (second inter-vehicle distance image) 52, both of which are related to the shortening of the target inter-vehicle distance La. For example, when the situation determination unit 23 determines that the subject vehicle will be able to pass through the intersection together with the preceding vehicle without stopping by switching the setting of the target inter-vehicle distance La from the longest distance La4 to the short distance La1, the display control unit 26 displays the inter-vehicle distance image 52 in relation to the short distance La1. In this case, the vehicle image 51 is upsized in accordance with the shortening of the target inter-vehicle distance La.

An image displayed within the lower right area A13 indicates that the subject vehicle will be able to pass through the intersection without stopping by switching the setting of the target inter-vehicle distance La that has been currently set, from La4 to La1. In short, the displayed image is formed by scaling down an image (passable image) which is the same as that illustrated in FIG. 2B containing the background image 15 and the driving behavior image 16.

In FIG. 5, as described above, a predicted movement of the subject vehicle in the case where the setting of the target inter-vehicle distance La is unchanged is displayed within the upper right area A11. In addition, a predicted movement of the subject vehicle in the case where the setting of the target inter-vehicle distance La is changed is displayed within the lower right area A13. Through both the displays, the driver can recognize that the subject vehicle will be unable to pass through the intersection without stopping if a current setting is unchanged but will be able to pass through the intersection without stopping by changing the setting of the target inter-vehicle distance La. As a result, the driver can recognize whether it is necessary to operate the setting switch 5 and thus can change the setting of the target inter-vehicle distance La at optimum timings.

When the driver operates the setting switch 5 to shorten the target inter-vehicle distance La (e.g., switch the target inter-vehicle distance from La4 to La1), the driving control unit 24 controls the travel actuator 6 so that the actual inter-vehicle distance L becomes equal to the target inter-vehicle distance La related to the newly set value (La1). In this case, the display control unit 26 controls the monitor 10 so as to display the passable image illustrated in FIG. 2B. In other words, the display control unit 26 switches the display image from the image illustrated in FIG. 5 to the image illustrated in FIG. 2B. Alternatively, the display control unit 26 may control the monitor 10 so as to continue to display the conditional passage image illustrated in FIG. 5 until the subject vehicle passes through the intersection.

Figure 6:
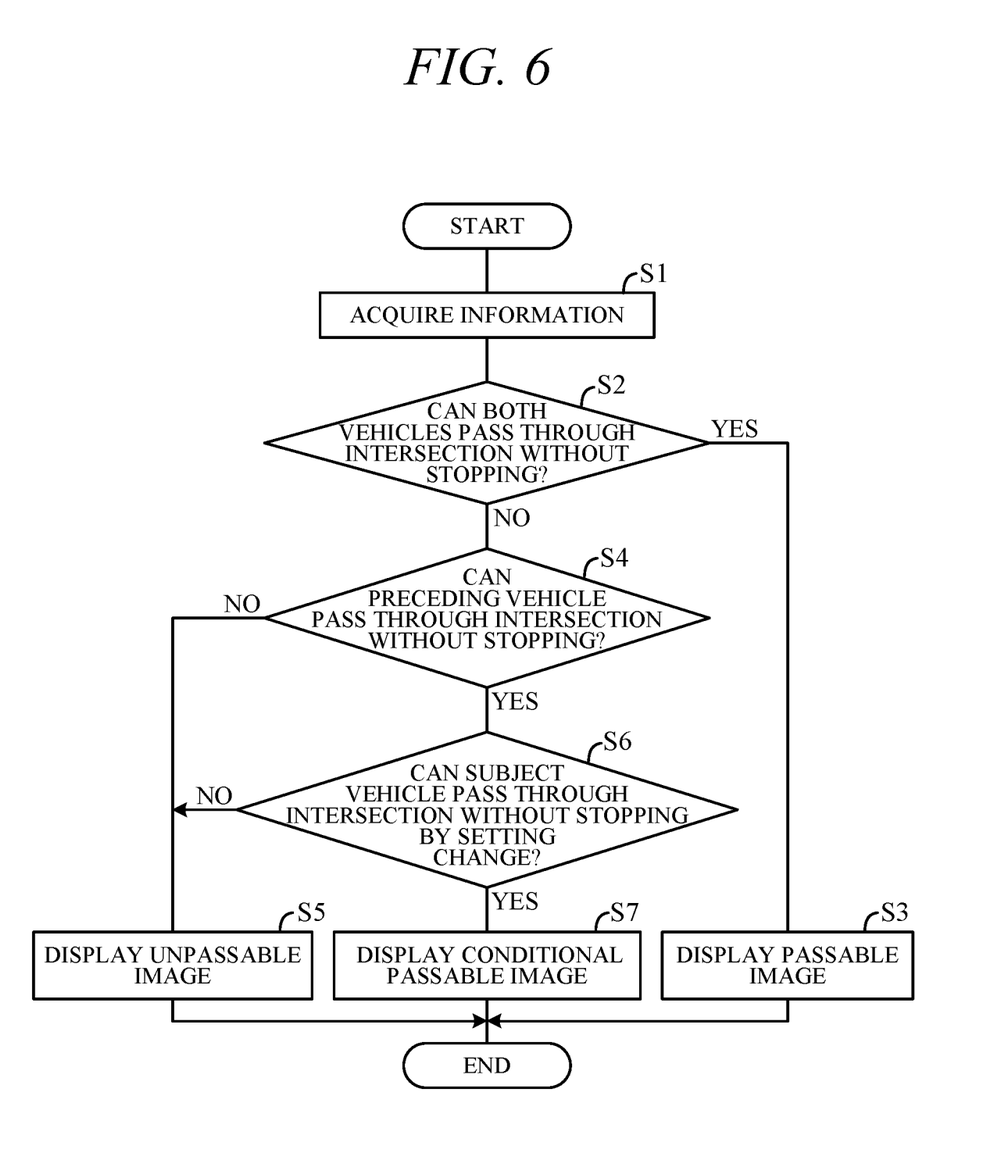
FIG. 6 is a flowchart illustrating an example of processing executed by a controller in FIG. 4.

FIG. 6 is a flowchart showing an example of processing executed by the controller 20 (microprocessor) in FIG. 4, mainly processing in the display control unit 26. The processing shown in the flowchart starts when, for example, a driver operates the following travel start switch, and is repeated at a predetermined cycle as long as the following travel to the preceding vehicle is continued.

As illustrated in FIG. 6, first, in S1 (S: processing step), the controller acquires the traffic light information received by the communication unit 1 and also acquires the inter-vehicle distance information based on a signal from the distance sensor 2, the vehicle speed information based on a signal from the vehicle speed sensor 3, the position information of the subject vehicle based on a signal from the positioning sensor 4, and the target inter-vehicle distance information based on a signal from the setting switch 5. The traffic light information includes information regarding a remaining time (green light remaining time, red light remaining time) until the traffic light is switched from green to yellow or from red to green. In S1, the controller further acquires information regarding a legal speed of a road on which the subject vehicle is traveling by referring to the road information stored in advance in the memory.

Next, in S2, the controller determines whether both the preceding vehicle and the subject vehicle will be able to pass the intersection with the traffic light without stopping, while keeping the current target inter-vehicle distance La, based on various pieces of information acquired in S1. Specifically, in the case that the traffic light is currently green, this determination is performed using the remaining time until the traffic light switches to yellow, the distance from the subject vehicle to the intersection, and the vehicle speed of the subject vehicle. If an affirmative decision is made in S2, the processing proceeds to S3, in which the controller outputs a control signal to the monitor 10 so as to display the passable image (FIG. 2B), and terminates the processing.

If a negative decision is made in S2, the processing proceeds to S4, in which the controller determines whether the preceding vehicles will be able to pass through the intersection without stopping. Specifically, the controller detects the vehicle speed of the preceding vehicle based on the vehicle speed of the subject vehicle and an amount of change in the actual inter-vehicle distance L, calculates the distance from the preceding vehicle to the intersection by subtracting the actual inter-vehicle distance from the distance from the subject vehicle to the intersection, and performs the determination using these the vehicle speed and the distance to the intersection of the preceding vehicle, and the remaining time until the traffic light switches to yellow. If a negative decision is made in S4, the processing proceed to S5. When the traffic light is red, the negative decision is made in S4 and the processing proceeds to S5, regardless of the vehicle speed of the preceding vehicle or the distance to the intersection of the preceding vehicle. In this case, both of the preceding vehicle and the subject vehicle stop at the intersection, and in S5, the controller outputs a control signal to the monitor 10 so as to display the unpassable image (FIG. 3B), and terminates the processing.

On the other hand, if an affirmative decision is made in S4, the processing proceeds to S6. That is, when it is predicted that although the preceding vehicle can pass through the intersection without stopping, the subject vehicle cannot pass through the intersection without stopping at the target inter-vehicle distance La set at the current time, the processing proceeds to S6. In S6, the controller determines whether not only the preceding vehicle but also the subject vehicle will be able to pass through the intersection without stopping by changing the setting of the target inter-vehicle distance La. If a negative decision is made in S6, the processing proceeds to S5, in which the controller outputs a control signal to the monitor 10 so as to display the unpassable image. However, in this case, since the following travel is no longer performed, the unpassable image (for example, FIG. 3A) when the non-following travel is performed, is displayed on the monitor 10.

On the other hand, if an affirmative decision is made in S6, the processing proceeds to S7. In S7, the controller outputs a control signal to the monitor 10 so as to display the conditional passable image (FIG. 5) including the target inter-vehicle distance La (for example, a set value La1), and terminates the processing. Accordingly, the driver can recognize that the subject vehicle will be able to pass through the intersection without stopping by changing the setting of the target inter-vehicle distance La through an operation of the setting switch 5. The information regarding the setting change of the target inter-vehicle distance La may be notified by sound in addition to or in place of displaying images.

An operation performed by the driving assistance apparatus 100 according to the embodiment will be described in more detail. As shown in FIG. 1A, when the subject vehicle 101 is traveling toward the traffic light 201 alone (during the non-following travel), a predetermined image is displayed on the display screen 10a of the monitor 10, based on the traffic light information, the position information, the vehicle speed information, and other information. More specifically, when it is determined that the subject vehicle 101 will be able to pass through the intersection with the traffic light 201 without stopping, a passable image, for example, shown in FIG. 2A, is displayed. When it is determined that the subject vehicle 101 needs to stop on the stop line 203 in front of the intersection with the traffic light 201, an unpassable image, for example, shown in FIG. 3A, is displayed. If no traffic light is installed ahead of the subject vehicle 101, an image formed by deleting both the target vehicle speed image 12 and the driving behavior image 16 from the image of FIG. 2A, for example, is displayed on the monitor 10.

As shown in FIG. 1B, when the subject vehicle 101 is following the preceding vehicle 102, namely, when the subject vehicle 101 is traveling toward the traffic light 201 while the travel actuator 6 is controlled so that the actual inter-vehicle distance L becomes equal to the target inter-vehicle distance La, a predetermined image is displayed on the display screen 10a of the monitor 10, based on the traffic light information, the actual inter-vehicle distance information, the vehicle speed information, the position information, the target inter-vehicle distance, and other information. More specifically, when it is determined that both the preceding vehicle 102 and the subject vehicle 101 can be able to pass without stopping at the intersection with the traffic light 201, the passable image shown in FIG. 2B, for example, is displayed (S3). When it is determined that both the preceding vehicle 102 and the subject vehicle 101 need to stop in front of the intersection with the traffic light 201, the unpassable image shown in FIG. 3B, for example, is displayed (S5). If no traffic light is installed ahead of both the preceding vehicle 102 and the subject vehicle 101, an image formed by deleting the driving behavior image 16 from the image of FIG. 2B, for example, is displayed on the monitor 10.

On the other hand, when it is determined that the preceding vehicle 102 will be able to pass through the intersection with the traffic light 201 without stopping but the subject vehicle 101 will be unable to pass it through without stopping, it is further determined whether the subject vehicle 101 will be able to pass it through by shortening the target inter-vehicle distance La (S6). For example, when the subject vehicle 101 is following the preceding vehicle with the target inter-vehicle distance La set to the longest distance La4, if it is determined that the subject vehicle 101 can be able to pass through the intersection without stopping by switching the setting of the target inter-vehicle distance La from the longest distance La4 to the short distance La1, a conditional passable image shown in FIG. 5 is displayed on the display screen 10a of the monitor 10 (S7).

The above operation allows the driver to easily recognize from the conditional passable image that it is necessary to temporarily change the setting of the target inter-vehicle distance La in order for the subject vehicle 101 to pass through the intersection together with the preceding vehicle 102 and continue to follow the preceding vehicle 102. The information on a value to which the target inter-vehicle distance La is to be set is simultaneously displayed on the display screen 10a (within the lower left area A14 in FIG. 5). This can help the driver set the target inter-vehicle distance La to an optimum value (La1).

When the driver who views the image on the monitor 10 operates the setting switch 5 to switch the setting of the target inter-vehicle distance La from La4 to La1, for example, the travel actuator 6 is controlled so as to shorten the actual inter-vehicle distance L. This enables the subject vehicle 101 to pass, without stopping, through the intersection together with the preceding vehicle 102, thereby continuing to follow the preceding vehicle 102. After the driver operates the setting switch 5 to shorten the target inter-vehicle distance La, an image on the monitor 10 is switched to the passable image (FIG. 2B), for example.

When the subject vehicle 101 has passed through the intersection, more specifically, when it is determined by the controller 20 based on a signal from the positioning sensor 4 that the subject vehicle 101 has passed through the intersection, the setting of the target inter-vehicle distance La is returned to the previous value (La4) independently of an operation on the setting switch 5 by the setting unit 25. Therefore, the travel actuator 6 is controlled so that the actual inter-vehicle distance L becomes equal to the longest distance La4. This enables the subject vehicle to continue to smoothly follow the preceding vehicle without involving the driver's operation of returning the setting of the target inter-vehicle distance La to the previous one. The shortening of the target inter-vehicle distance La when the subject vehicle is traveling in front of the intersection is simply a temporary operation in order for the subject vehicle to continue to follow the preceding vehicle. Thus, after the subject vehicle passes through the intersection, the setting of the target inter-vehicle distance La is returned to the previous one, which is presumed to be in line with a driver's intention. In consideration of this, the setting of the target inter-vehicle distance La is automatically returned to the previous one, so that the driver can easily drive the subject vehicle without having to re-operate the setting switch 5.

According to the foregoing embodiment, the following operations and effects are achievable.

(1) A driving assistance apparatus 100 includes: a driving control unit 24 that controls a travel actuator 6 so that an subject vehicle 101 follows a preceding vehicle 102 traveling ahead of the subject vehicle 101 with a predetermined target inter-vehicle distance La therebetween; an information acquisition unit 21 that acquires traffic light information containing switching information on a traffic light 201, position information indicating a position of the subject vehicle 101 relative to the traffic light 201 (e.g., a distance to the traffic light 201), and inter-vehicle distance information indicating an actual inter-vehicle distance L between the subject vehicle 101 and the preceding vehicle 102; a monitor 10 that displays information; and a display control unit 26 that controls the monitor 10 so as to notify a driver of the information, based on the traffic light information, the position information, and the inter-vehicle distance information acquired by the information acquisition unit 21 (see FIG. 4). The display control unit 26 controls the monitor 10 so as to notify information on the target inter-vehicle distance (recommended inter-vehicle distance) La (information for shortening the target inter-vehicle distance) that enables the subject vehicle 101 to travel together with the preceding vehicle 102 without receiving a stop instruction from the traffic light 201, namely, without stopping in front of an intersection at which the traffic light 201 is installed (see FIG. 5).

The above operation enables the driver to recognize that the subject vehicle 101 will be able to pass through the intersection together with the preceding vehicle 102 without stopping by shortening the target inter-vehicle distance La in accordance with the display on the monitor 10. As a result, the subject vehicle 101 can continue to follow the preceding vehicle 102 and notify the driver in a vehicle having a following traveling function of useful driving assistance information.

(2) The driving assistance apparatus 100 further includes: a setting unit 25 that, when the subject vehicle 101 follows the preceding vehicle 102, sets the target inter-vehicle distance La in accordance with a driver's request; and a situation determination unit 23 that, when the subject vehicle 101 follows the preceding vehicle 102 at the target inter-vehicle distance La set by the setting unit 25, determines whether a predetermined situation arises where the preceding vehicle 102 does not receive a stop command from the traffic light 201 but the subject vehicle 101 receives the stop command (FIG. 4). When the situation determination unit 23 determines that the predetermined situation arises, the display control unit 26 controls the monitor 10 so as to notify the driver that it is necessary to change a setting of the target inter-vehicle distance La so as become shorter by operating the setting switch 5, namely, to display a conditional passable image (FIG. 5) (FIG. 6). This enables the driver to change the setting of the target inter-vehicle distance La by operating the setting switch 5 at an appropriate timing, thereby causing the subject vehicle 101 to readily pass through the intersection at which the traffic light is green.

(3) After the setting of the target inter-vehicle distance La is changed (e.g., from La4 to La1) in accordance with the driver's request, the setting unit 25 returns the target inter-vehicle distance La to a previous value (La4) independently of a driver's request when the subject vehicle 101 has passed through the intersection at which the traffic light 201 is installed (FIG. 4). In this way, after the subject vehicle has passed through the intersection, the setting unit automatically changes the setting of the target inter-vehicle distance La so as to presumably satisfy the driver's request, thereby allowing the driver to easily perform a drive operation without having to set the target inter-vehicle distance La again.

(4) When the driving control unit 24 controls the travel actuator 6 so that the subject vehicle 101 follows the preceding vehicle 102, the display control unit 26 controls the monitor 10 so as not to display information on a target vehicle speed of the subject vehicle 101 (FIG. 2B and FIG. 3B). When the driving control unit 24 does not control the travel actuator 6 so that the subject vehicle 101 follows the preceding vehicle 102, the display control unit 26 controls the monitor 10 so as to display an image of the target vehicle speed of the subject vehicle 101 (FIG. 2A and FIG. 3A). When the subject vehicle 101 follows the preceding vehicle 102, the driving control unit 24 controls the travel actuator 6 so as to accelerate or decelerate the subject vehicle 101, independently of a driver's drive operation, so that the driver does not have to refer to information on the target vehicle speed. Therefore, the display control unit 26 does not have to display information on the target vehicle speed, thereby suppressing displaying of unnecessary information, which may confuse the driver.

The above embodiment can be modified to various forms. Several modifications will be described below. In the above embodiment, the information acquisition unit 21 acquires the traffic light information including the switching information of the traffic light transmitted from the optical beacon roadside unit 202. However, after the current position of the subject vehicle is specified by the positioning sensor 4, the information acquisition unit may acquire the traffic light information transmitted from the server device that manages the switching of the traffic light corresponding to the current position of the subject vehicle. Although in the above embodiment, the inter-vehicle distance L is detected by using the distance sensor 2 such as a radar or a LIDAR, the inter-vehicle distance may be detected by using another sensor such as a camera. Although in the above embodiment, the position of the subject vehicle is detected by the positioning sensor 4, the position of the subject vehicle with respect to the traffic light may be detected by using a radar, a LIDAR, or a camera.

In the above embodiment, the information on the recommended inter-vehicle distance that enables the subject vehicle to travel together with the preceding vehicle without receiving the stop command by the traffic light is notified to the driver via the monitor 10 (a display part), but in addition to the display, it may be notified to the driver by audio output. In the above embodiment, the target inter-vehicle distance La is set by operating of the setting switch 5 by the driver. However, the configuration of a setting unit that sets the target inter-vehicle distance in accordance with a command from the driver is not limited to the configuration described above. In the above embodiment, the situation determination unit 23 determines whether there is a predetermined situation in which the preceding vehicle is not instructed to stop by the traffic light, while the subject vehicle is instructed to stop. However, the display control unit 26 or the like may have a function as a determination unit. In the above embodiment, after the setting of the target inter-vehicle distance La is changed by the setting switch 5 in response to a command from the driver, when the subject vehicle passes through the intersection, the setting unit 25 returns the target inter-vehicle distance La to the value prior to the setting change regardless of the command from the driver. However, the driving control unit 24 or the like may have a function as a setting unit.

In the above embodiment, when the situation determination unit 23 determines that the specific situation (a predetermined situation) arises, the driver is notified that the subject vehicle can pass through the intersection without stopping by changing the setting by the setting switch 5 so as to shorten the target inter-vehicle distance La (change of setting from a first target inter-vehicle distance to a second target inter-vehicle distance). However, the driver may be notified that the subject vehicle can pass through the intersection without stopping by simply shortening the target inter-vehicle distance. Therefore, the configuration of a display control unit is not limited to the above configuration. Although in the above embodiment, a passable image (FIG. 2A and FIG. 2B), an unpassable image (FIG. 3A and FIG. 3B) and a conditional passable image (FIG. 5) are illustrated as an example of an image displayed on the monitor 10, the configurations of these images are not limited to those described above.

In the above embodiment, the configuration of the driving assistance apparatus 100 is described by referring to the case where the subject vehicle passes through the intersection where the traffic light is installed. However, the traffic light may be installed in not only the intersection but also a pedestrian crossing or the like. In this case also, the driving assistance apparatus of the present invention can be applied. In other words, in a case where the subject vehicle passes through a point where a traffic light capable of acquiring traffic light information is installed, the driving assistance apparatus can be similarly applied.

The present invention can also be used as a driving assistance method including controlling a travel actuator 6 so that a subject vehicle 101 follows a preceding vehicle 102 traveling ahead of the subject vehicle 101 while keeping a target inter-vehicle distance; acquiring traffic light information including switching information on a traffic light 201, position information on a position of the subject vehicle 101 with respect to the traffic light 201, and inter-vehicle distance information on an inter-vehicle distance from the subject vehicle 101 to the preceding vehicle 102, the traffic light periodically instructing a driver to stop at a predetermined position; and controlling a display part 10 so as to notify the driver of information during following the preceding vehicle, based on the traffic light information, the position information and the inter-vehicle distance information acquired, wherein the controlling includes controlling the display part so as to notify information on a recommended inter-vehicle distance allowing the subject vehicle to travel while following the preceding vehicle 102 without receiving a stop instruction from the traffic light 201.

The above embodiment can be combined as desired with one or more of the above modifications. The modifications can also be combined with one another.

According to the present invention, it is possible to notify a driver of a vehicle with a following traveling function of useful driving assistance information.

Above, while the present invention has been described with reference to the preferred embodiments thereof, it will be understood, by those skilled in the art, that various changes and modifications may be made thereto without departing from the scope of the appended claims.

What is claimed is:

1. A driving assistance apparatus comprising:
a display configured to display information; and
an electronic control unit including a microprocessor and a memory connected to the microprocessor, wherein the microprocessor is configured to perform:
   controlling a travel actuator so that a subject vehicle follows a preceding vehicle traveling ahead of the subject vehicle while keeping a target inter-vehicle distance;
   acquiring traffic light information including switching information on a traffic light, position information on a position of the subject vehicle with respect to the traffic light, and inter-vehicle distance information on an inter-vehicle distance from the subject vehicle to the preceding vehicle, the traffic light periodically instructing a driver to stop at a predetermined position; and
   controlling the display to notify the driver of information while following the preceding vehicle, based on the traffic light information, the position information and the inter-vehicle distance information acquired,
the microprocessor is configured to perform
the controlling including controlling the display:
   to notify the driver of information on a recommended inter-vehicle distance allowing the subject vehicle to travel while following the preceding vehicle without receiving a stop instruction from the traffic light,
   not to display information on a target vehicle speed of the subject vehicle when the travel actuator is controlled to follow the preceding vehicle, and
   to display an image indicating the target vehicle speed when the travel actuator is not controlled to follow the preceding vehicle.

2. The driving assistance apparatus according to claim 1, wherein
the microprocessor is configured to further perform:
   setting the target inter-vehicle distance in accordance with an instruction from the driver when the subject vehicle follows the preceding vehicle; and
   determining whether a predetermined situation arises when the subject vehicle follows the preceding vehicle at the target inter-vehicle distance set,
the predetermined situation is a situation where the preceding vehicle does not receive the stop instruction from the traffic light, while the subject vehicle receives the stop instruction, and
the microprocessor is configured to perform
the controlling including controlling the display to notify the driver that the microprocessor is going to change a setting of the target inter-vehicle distance to shorten the target inter-vehicle distance by the instruction from the driver, when the microprocessor determines that the predetermined situation arises.

3. The driving assistance apparatus according to claim 2, wherein
the microprocessor is configured to perform
the controlling including controlling the display to notify the driver that it the microprocessor is going to change the setting of the target inter-vehicle distance from a first inter-vehicle distance to a second inter-vehicle distance shorter than the first inter-vehicle distance by the instruction from the driver, when the microprocessor determines that the predetermined situation arises, and the setting including changing the target inter-vehicle distance from the second inter-vehicle distance to the first inter-vehicle distance regardless of the instruction from the driver, after the subject vehicle passes through the predetermined position under a condition that the target inter-vehicle distance is changed from the first inter-vehicle distance to the second inter-vehicle distance by the instruction from the driver.

4. The driving assistance apparatus according to claim 2, wherein the microprocessor is configured to perform the controlling including controlling the display to display side by side a first inter-vehicle distance image indicating the target inter-vehicle distance set in accordance with the instruction from the driver and a second inter-vehicle distance image indicating the recommended inter-vehicle distance when the microprocessor determines that the predetermined situation arises, wherein a length of the second inter-vehicle image is shorter than a length of the first inter-vehicle distance image.

5. The driving assistance apparatus according to claim 4, wherein the microprocessor is configured to perform the controlling including controlling the display to display a first preceding vehicle image representing a rear surface of the preceding vehicle so as to associate with the first inter-vehicle distance image, and a second preceding vehicle image representing the rear surface of the preceding vehicle so as to associate with the second inter-vehicle distance image, wherein a size of the second preceding vehicle image is larger than a size of the first preceding vehicle image.

6. The driving assistance apparatus according to claim 1, further comprising a storage part pre-storing a plurality of characteristics indicating relationships between a vehicle speed of the subject vehicle and the target inter-vehicle distance, wherein the microprocessor is configured to perform the setting including selecting one of the plurality of characteristics in accordance with the instruction from the driver, and setting the target inter-vehicle distance based on the selected one of the plurality of characteristics.

7. A driving assistance apparatus comprising:

a display configured to display information; and an electronic control unit including a microprocessor and a memory connected to the microprocessor, wherein the microprocessor is configured to function as:

a driving control unit that controls a travel actuator so that a subject vehicle follows a preceding vehicle traveling ahead of the subject vehicle while keeping a target inter-vehicle distance;

an information acquisition unit that acquires traffic light information including switching information on a traffic light, position information on a position of the subject vehicle with respect to the traffic light, and inter-vehicle distance information on an inter-vehicle distance from the subject vehicle to the preceding vehicle, the traffic light periodically instructing a driver to stop at a predetermined position; and a display control unit that controls the display to notify the driver of information while following the preceding vehicle, based on the traffic light information, the position information and the inter-vehicle distance information acquired by the information acquisition unit, the display control unit controls the display:

to notify the driver of information on a recommended inter-vehicle distance allowing the subject vehicle to travel while following the preceding vehicle without receiving a stop instruction from the traffic light, not to display information on a target vehicle speed of the subject vehicle when the travel actuator is controlled by the driving control unit to follow the preceding vehicle, and to display an image indicating the target vehicle speed when the travel actuator is not controlled to follow the preceding vehicle.

8. The driving assistance apparatus according to claim 7, wherein the microprocessor is configured to further function as:

a setting unit that sets the target inter-vehicle distance in accordance with an instruction from the driver when the subject vehicle follows the preceding vehicle; and a determination unit that determines whether a predetermined situation arises when the subject vehicle follows the preceding vehicle at the target inter-vehicle distance set by the setting unit, the predetermined situation is a situation where the preceding vehicle does not receive the stop instruction from the traffic light, while the subject vehicle receives the stop instruction, and the display control unit controls the display to notify the driver that the microprocessor is going to change a setting of the target inter-vehicle distance so as to shorten the target inter-vehicle distance by the instruction from the driver, when the determination unit determines that the predetermined situation arises.

9. The driving assistance apparatus according to claim 8, wherein the display control unit controls the display to notify the driver that it is necessary to change the setting of the target inter-vehicle distance from a first inter-vehicle distance to a second inter-vehicle distance shorter than the first inter-vehicle distance by the instruction from the driver, when the determination unit determines that the predetermined situation arises, and the setting unit changes the target inter-vehicle distance from the second inter-vehicle distance to the first inter-vehicle distance regardless of the instruction from the driver, after the subject vehicle passes through the predetermined position under a condition that the target inter-vehicle distance is changed from the first inter-vehicle distance to the second inter-vehicle distance by the instruction from the driver.

10. The driving assistance apparatus according to claim 8, wherein the display control unit controls the display to display side by side a first inter-vehicle distance image indicating the target inter-vehicle distance set by the setting unit and a second inter-vehicle distance image indicating the recommended inter-vehicle distance when the determination unit determines that the predetermined situation arises, wherein a length of the second inter-vehicle image is shorter than a length of the first inter-vehicle distance image.

11. The driving assistance apparatus according to claim 10, wherein
the display control unit controls the display to display a first preceding vehicle image representing a rear surface of the preceding vehicle so as to associate with the first inter-vehicle distance image, and a second preceding vehicle image representing the rear surface of the preceding vehicle so as to associate with the second inter-vehicle distance image,
wherein a size of the second preceding vehicle image is larger than a size of the first preceding vehicle image.

12. The driving assistance apparatus according to claim 7, further comprising
a storage part pre-storing a plurality of characteristics indicating relationships between a vehicle speed of the subject vehicle and the target inter-vehicle distance, wherein
the setting unit selects one of the plurality of characteristics in accordance with the instruction from the driver, and sets the target inter-vehicle distance based on the selected one of the plurality of characteristics.

13. A driving assistance method comprising:
controlling a travel actuator so that a subject vehicle follows a preceding vehicle traveling ahead of the subject vehicle while keeping a target inter-vehicle distance;
acquiring traffic light information including switching information on a traffic light, position information on a position of the subject vehicle with respect to the traffic light, and inter-vehicle distance information on an inter-vehicle distance from the subject vehicle to the preceding vehicle, the traffic light periodically instructing a driver to stop at a predetermined position; and
controlling a display to notify the driver of information while following the preceding vehicle, based on the traffic light information, the position information and the inter-vehicle distance information acquired, wherein
the controlling includes controlling the display:
to notify the driver of information on a recommended inter-vehicle distance allowing the subject vehicle to travel while following the preceding vehicle without receiving a stop instruction from the traffic light,
not to display information on a target vehicle speed of the subject vehicle when the travel actuator is controlled by the driving control unit to follow the preceding vehicle, and
to display an image indicating the target vehicle speed when the travel actuator is not controlled to follow the preceding vehicle.

* * * * *